Oct. 5, 1954     G. M. THOMAS     2,690,932

VARIABLE LOAD BRAKE APPARATUS

Filed Sept. 30, 1952

INVENTOR.
*Glenn M. Thomas*
BY
*Adelbert A. Steinmiller*
ATTORNEY

Patented Oct. 5, 1954

2,690,932

UNITED STATES PATENT OFFICE 2,690,932

VARIABLE LOAD BRAKE APPARATUS

Glenn M. Thomas, Dravosburg, Pa., assignor to Westinghouse Air Brake Company, Wilmerding, Pa., a corporation of Pennsylvania Application September 30, 1952, Serial No. 312,202

8 Claims. (Cl. 303—22)

This invention relates to fluid pressure brake apparatus for railway vehicles and in particular to the type for braking a vehicle in accordance with the degree of load carried by the vehicle.

In a copending application, Serial No. 238,918, filed July 27, 1951, by Earle S. Cook, there is disclosed a brake apparatus having service and emergency portions operative upon service and emergency reductions in brake pipe pressure to supply fluid under pressure to effect service and emergency applications, respectively, of brakes on a railway vehicle. The brake apparatus also includes a load compensating valve portion which is automatically adjustable in accordance with the load on the vehicle to correspondingly limit the degree of brake application effected by such fluid under pressure.

The load compensating valve portion disclosed in the above mentioned application provides for a relatively large number of adjustments corresponding to a relatively large number of different degrees of load. It is believed, however, that three adjustments corresponding to an empty vehicle, a fully loaded vehicle and a partially loaded vehicle, such as one half load, are adequate for freight service and the principal object of the invention, therefore, is the provision of a relatively simple and inexpensive three adjustment device for use in a brake apparatus such as above described.

Other objects and advantages will become apparent from the following more detailed description of the invention.

Figure 1:
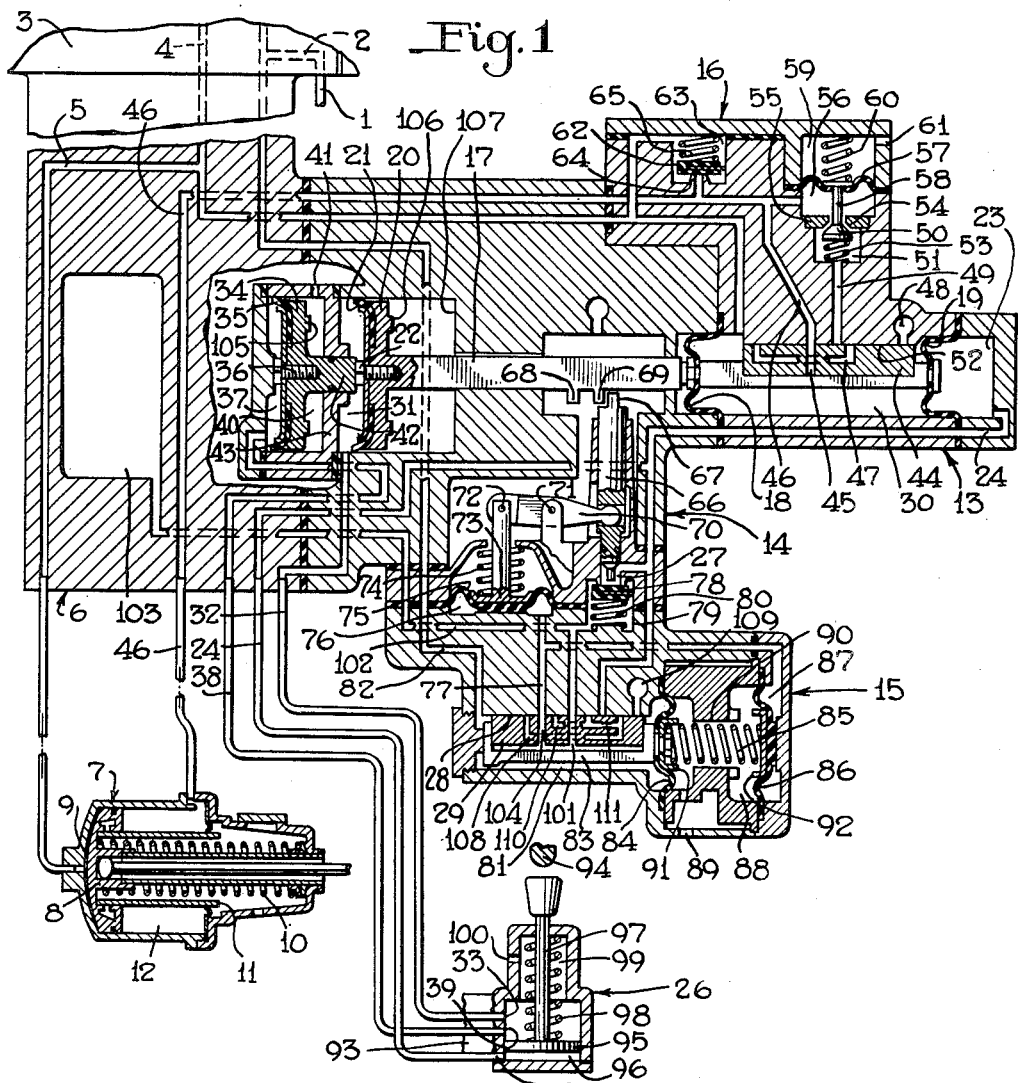
Figure 2:
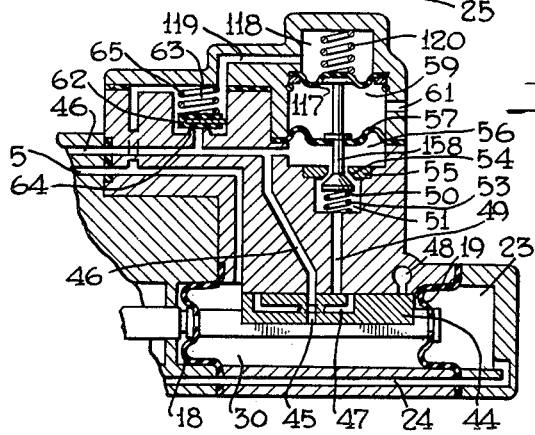

In the accompanying drawing, Fig. 1 is a diagrammatic view of a portion of a fluid pressure brake apparatus embodying the invention, and, Fig. 2 is a diagrammatic view of a modification of a portion of Fig. 1.

Description

As shown in Fig. 1, reference numeral 1 designates the usual brake pipe which is connected to a passage 2 in a brake controlling valve device 3 which may comprise service and emergency application valve devices, such as those disclosed in the above mentioned pending application, adapted to operate in the usual manner upon service and emergency reductions in brake pipe pressure to supply fluid under pressure to a brake cylinder passage 4. Fluid under pressure thus supplied to passage 4 is adapted to flow through a passage 5 in a device 6, embodying the invention, to a brake cylinder device 7 for actuating same to effect either a service or an emergency application of brakes according to the kind of reduction in brake pipe pressure.

The brake cylinder device 7 may comprise a casing containing a piston 8, at one side of which is the usual pressure chamber 9 in which fluid under pressure from passage 5 is adapted to become effective on said piston to move same in the direction of the right hand for applying brakes. Upon release of fluid under pressure from chamber 9 by way of passages 5 and 4 a return spring 10 is adapted to move piston 8 toward the left hand to a brake release position in which it is shown in the drawing. A cylinder 11 encircling return spring 10 and attached at one end to piston 8 and slidably mounted adjacent its opposite end in the casing cooperates with said piston and casing to define a load compensating chamber 12 around said cylinder for receiving fluid under pressure to oppose pressure of fluid in chamber 9 acting on piston 8. With a fully loaded vehicle chamber 12 will be open to atmosphere, as will be described later, in order that the brakes on the vehicle will be applied to a degree governed by the full pressure of fluid in chamber 9 acting on piston 8. With a vehicle empty a certain maximum pressure of fluid will be provided in chamber 12 whereby the degree of braking of the empty vehicle will be limited to the differential in opposing forces acting on piston 7. For a partially or half-loaded vehicle, for example, a certain lower pressure of fluid will be provided in chamber 12 in order to obtain a greater differential in opposing forces on piston 8 as necessary to provide the greater braking force for the half loaded vehicle than for the empty vehicle.

The device 6 comprises a casing containing a load adjustable control device 13, a locking device 14 for locking said control device in an adjusted position, a cut-off valve device 15 for controlling operation of devices 13 and 14, and a fluid pressure control device 16 for regulating pressure of fluid in the brake cylinder compensating chamber 12 according to the adjustment of the control device 13 and hence according to the load on the vehicle.

The load adajustable control device 13 comprises a brake control rod 17 connected adjacent one end to two spaced apart identical diaphragms 18, 19 and at the other end to a movable abutment in the form of a piston 20 having a packing cup 21 secured thereto by a headed bolt 22, the effective area of the piston being greater than that of said diaphragms. A chamber 23 formed in the casing at the outer side of diaphragm 19 is constantly connected through a passage and pipe 24 to a port 25 in a strut device 26, to a chamber 27 in a locking device 14, and, to a seat 28 for a slide valve 29 in the cut-off valve device 15. A chamber 30 formed in the casing between diaphragms 18, 19 is always connected to brake cylinder pressure chamber 9 by way of passage 5 and also to brake cylinder passage 4 in brake controlling valve device 3. At the outer side of piston 20 a chamber 31 is formed in the casing, which chamber is connected through a passage and pipe 32 to a port 33 in strut device 26.

The brake control rod 17 is arranged to be actuated to a position for braking a partially loaded vehicle by a piston 34 which is provided with a packing cup 35 secured thereto by means of a headed bolt 36 and provided with substantially the same effective area as that of piston 20. At the outer side of piston 34 is a chamber 37 which is connected through a passage and pipe 38 to a port 39 in strut device 26 while at the inner side of said piston is a chamber 40 which is constantly open to atmosphere via vent port 41. The piston 34 is provided with a stem 42 contained in chamber 40 and extending through a suitable bore in a wall 43 formed in the casing between chambers 40 and 31 into chamber 31 for operative contact with bolt 22 in rod 17. The stem 42 is provided with a sealing ring for preventing leakage of fluid under pressure from chamber 31 to atmospheric chamber 40.

Contained in chamber 30 is a slide valve 44 arranged to fit into a notched portion of rod 17 for movement thereby to any one of several positions to serve as a selector valve means, as will appear below. As shown in Fig. 1, the slide valve 44 is positioned to provide braking force for an empty vehicle, in which position a port 45 in said valve opens chamber 30 to a casing passage 46 so that as fluid under pressure is supplied from passage 4 to the main pressure chamber 9 in the brake cylinder device 7 fluid under pressure from said passage will also flow from said passage 4 through chamber 30, the port 45 in said slide valve and passage 46 in a slide valve seat 52 to the load compensating chamber 12, thus providing the same pressure in both brake cylinder chambers 9 and 12. In a position of slide valve 44 to the extreme right of that in which it is shown in Fig. 1, and which it will occupy for a fully loaded car, a passage 46, and consequently chamber 12, will be connected to atmosphere by way of a registering port 47 in the slide valve and an atmospheric vent port 48. Thus, pressure of fluid supplied by the brake controlling valve device 3 to brake cylinder passage 4 will be effective only in the main pressure chamber 9. In a position of slide valve 44 intermediate its empty and load positions, and which it will occupy for a partially loaded vehicle, the chamber 30 will be connected to the fluid pressure control valve device 16 by way of port 45 and a passage 49 in said device.

The fluid pressure control valve device 16 comprises a limiting valve 50 operatively mounted in a chamber 51 which is in constant communication through passage 49 with the seat 52 for slide valve 44. This chamber 51 also contains a bias spring 53 urging valve 50 toward engagement with a seat 54 formed on the perimeter of an opening in a wall 55 separating the chamber 51 from a diaphragm chamber 56. Chamber 56 is defined in part by a diaphragm 57 to which a stem 58 of valve 50 is positively connected. Diaphragm 57 separates chamber 56 from a chamber 59 containing a spring 60 of a selected strength and open to atmosphere through a vent port 61, so that in response to a predetermined pressure of fluid in chamber 56 said diaphragm will compress spring 60 and permit spring 53 to seat valve 50.

The control valve device 16 further comprises a check valve 62 contained in a chamber 63 and pressed against a seat 64 by a light bias spring 65 contained therein. Chamber 63 is in constant communication with brake cylinder passages 4, 5 while the seated area of valve 62 is subject to pressure of fluid in compensating chamber passage 46 so that, when the brake controlling valve device 3 operates to release fluid under pressure through pasage 4, release of fluid under pressure from compensating chamber 12 will not be delayed by the limiting valve 50.

The locking device 14 comprises a plunger 66 slidably mounted in a bore in the casing and having on one end a dog 67 for locking relation with teeth 68, 69 formed on the bottom surface of rod 17 to hold said rod in an adjusted position. A lever 70 having one end connected to plunger 66 and fulcrumed intermediate its ends on a pin 71 carried by the casing is connected at its opposite end by a pin 72 to a follower 73. A spring 74 acts on one side of follower 73 for actuating lever 70 to move plunger 66 into position for locking engagement with rod 17 while the opposite side of said follower is engaged by one side of a flexible diaphragm 75, at the opposite side of which is a chamber 76 which is connected through a passage 77 to slide valve seat 28 of cut-off valve device 15. When fluid under pressure is supplied through passage 77 to chamber 76, as will be described later, diaphragm 75 will be deflected thereby against spring 74 to operate lever 70 to move plunger 66 out of position for locking engagement with rod 17. Upon release of fluid under pressure from chamber 76 spring 74 will move plunger 66 into position for locking engagement with rod 17. A check valve 78 contained in a chamber 79 and normally seated by a spring 80 is arranged to be unseated by plunger 66 following withdrawal from position for locking engagement with rod 17 to thereby connect via pasasge 102 a volume reservoir 103 to chamber 27.

The cut-off valve device 15 comprises a casing having a chamber 81 which contains the slide valve 29 and which is in constant communication with brake pipe 1 by way of passages 82 and 2. The slide valve 29 is connected by a stem 83 to a flexible diaphragm 84 for movement thereby. The diaphragm 84 is subject on one face to pressure of fluid in chamber 81 and on the opposite face to pressure of a spring 85, one end of which engages said diaphragm while the opposite end engages one side of a coaxially arranged flexible diaphragm 86, at the opposite side of which is a pressure chamber 87 open by way of passage 77 to slide valve seat 28 and to diaphragm chamber 76. Between the two diaphragms 84, 86 is a chamber 88 which is open to atmosphere by way of a vent port 89. Extending into chamber 88 is a casing stop 90 arranged for contact by followers 91, 92 associated with diaphragms 84, 86, respectively, for limiting deflection thereof in the direction of said stop.

Whenever the pressure of fluid in brake pipe 1 is less than a chosen degree, such as ten pounds, spring 85 will deflect diaphragm 84 against such pressure in chamber 81 and thereby move slide valve 29 to a cut-in position in which it is shown in Fig. 1 and which position may be defined by contact of the left-hand end of stem 83 with the casing. In this position of slide valve 29, passage 77 and diaphragm chamber 87 will be open to brake pipe 1 by way of a port 104 in said slide valve, and spring 85 will be holding diaphragm 86 in the position in which it is shown in Fig. 1.

The strut device 26 is adapted to be carried by a sprung portion 93 of a vehicle underneath an unsprung portion 94 whereby it will be spaced away from said unsprung portion 94 a distance which varies according to the degree of load on the vehicle.

The strut device 26 comprises a casing containing a vertically movable piston 95, at the lower side of which is a pressure chamber 96 open by way of port 25 and passage and pipe 24 to chamber 23 in the load adjustable control device 13. Projecting upwardly from the upper side of piston 95 is a rod 97 terminating exteriorly of the casing below the unsprung portion 94 of the vehicle. A spring 98 contained in a chamber 99 of the casing of the device acts on piston 95 for urging it to the position in which it is shown in Fig. 1, said chamber being open to atmosphere through a vent port 100.

When the vehicle is empty, the strut device 26 will occupy a position relative to the unsprung portion 94 such as shown in Fig. 1 and in which upward movement of piston 95 will be so limited by engagement with the unsprung portion 94 as not to connect chamber 96 with either ports 33 or 39. When the vehicle is substantially half-loaded, the strut device will occupy a lower position relative to the unsprung portion 94 to permit sufficient movement of piston 95 to connect pipe 38 to chamber 96 through port 39. When the vehicle is fully-loaded, such movement of piston 95 will be permitted as to open chamber 96 to pipe 38 also through port 33 to pipe 32.

In initially charging brake pipe 1, or upon charging said brake pipe following venting thereof to any pressure less than the exemplary ten pounds, fluid under pressure will flow from said brake pipe to valve chamber 81 of cut-off valve device 15 and thence through a port 101 to passage 102 leading to check valve chamber 79 and to the volume reservoir 103 for charging said chamber and reservoir with fluid at the pressure in the brake pipe. At the same time, fluid under pressure will also flow through port 104 to passage 77 and thence to diaphragm chambers 76 and 87. When a sufficient pressure of fluid is thus obtained in chamber 76 to overcome the opposing pressure of spring 74 on diaphragm 75, said diaphragm will deflect against said spring and move plunger 66 out of position for locking engagement with rod 17 followed by unseating of check valve 78 by said plunger. Upon release of plunger 66 from rod 17 and unseating of check valve 78 fluid under pressure now present in the volume reservoir 103 and chamber 79 and reenforced by continued supply from chamber 81 through port 101 to passage 102 will flow through chamber 27 and passage 24 to chamber 23 and promptly cause diaphragm 19 to deflect to the left moving rod 17, diaphragm 18, and pistons 20, 34 to the position in which they are shown in Fig. 1, unless already so positioned.

Fluid under pressure supplied to passage 24 also flows through port 25 to chamber 96 in the strut device 26. The pressure of fluid thus obtained in chamber 96 will move piston 95 upward until stopped by contact of piston rod 97 with the unsprung portion 94 of the vehicle. If the vehicle is empty, this movement of piston 94 being so limited as not to open chamber 96 to pipe 38 via port 39, said pipe and thereby piston chamber 37 will not be supplied with fluid under pressure and rod 17 will remain in the position shown in Fig. 1 under the influence of pressure of fluid in chamber 23 acting on diaphragm 19.

If the vehicle is carrying, for example, a half-load, the strut device 26 will be so disposed relative to the unsprung portion 94 of the vehicle, that the fluid under pressure provided in chamber 96, as above described, will move the piston 95 past the port 39 before piston rod 97 contacts the unsprung portion 94 of the vehicle. Fluid under pressure will then flow from chamber 96 through port 39 to pipe 38 and thence to piston chamber 37 to act on piston 34 in the load adjustable control device 13. It will be noted that piston chamber 31 is at this time open to atmosphere through passage and pipe 32, port 33, chamber 99 and port 100, whereby pressure of fluid in chamber 23 acting on diaphragm 19 will hold the piston 20 against the stem 42 of piston 34. Thus, when the pressure of fluid in chamber 37 increases sufficiently to provide a force on piston 34 which exceeds the opposing force created by pressure of fluid in chamber 23 acting on diaphragm 19, the prevailing piston 34 will actuate rod 17 and the attached members to a position defined by contact of bosses 105, formed on the right-hand side of piston 34 as viewed in Fig. 1, with the left-hand face of wall 43.

If the vehicle is carrying a full-load, the strut device 26 will be so disposed relative to the unsprung portion 94 of the vehicle, that fluid under pressure provided in chamber 96 will move the piston 95 past both ports 39 and 33 before piston rod 97 contacts the unsprung portion 94. Fluid under pressure will then flow from chamber 96 through port 33 to pipe 32, whence it will flow to piston chamber 31 and at the same time fluid under pressure will also flow from chamber 96 through port 39 to piston chamber 37 in the load adjusting control device 13. Piston 34 will be therefore moved to its extreme right-hand position by pressure of fluid in chamber 37 as above described but without effect in the present instance, since piston 20 in response to pressure of fluid provided in chamber 31 will move the rod 17 further to the right, against pressure of fluid in chamber 23 acting on diaphragm 19, until stopped by the engagement of bosses 106 formed on the right-hand side of piston 20 with a wall 107 in the casing.

While the rod 17 is being adjusted to a position corresponding to the loaded condition of the vehicle, as above described, the pressure of fluid in brake pipe 1 and in valve chamber 81 and diaphragm chamber 87 of the cut-off valve device 15 will continue to increase. This increase in pressure in chamber 87 on diaphragm 86 will gradually deflect said diaphragm against spring 85 for increasing the pressure of said spring against diaphragm 84 in order that diaphragm 84 and the slide valve 29 will not be moved by increasing pressure of fluid in brake pipe 1 and valve chamber 81 until after rod 17 has been properly adjusted as above described. Finally, at a chosen pressure in brake pipe 1 and diaphragm chamber 87, such as thirty-five pounds, deflection of diaphragm 86 will be stopped by engagement of follower 92 with the casing stop 90. As pressure in brake pipe 1 and valve chamber 81 then continues to increase, such pressure will deflect diaphragm 84 against spring 85 and finally move slide valve 29 to a cut-off position defined by contact between diaphragm follower 91 and casing stop 90.

In this cut-off position of slide valve 29, ports 104 and 101 will be out of register with passages 77 and 102 in order to cut off the supply of fluid under pressure thereto from brake pipe 1 while a port 108 in slide valve 29 will connect passage 77 to an atmospheric passage 109, and a port 110 will connect passages 102 and 24 through a choke 111 to port 108 and thence to atmosphere via passage 109 for thereby venting passages 77, 102 and 24.

Such venting of fluid under pressure from passage 77 will result in venting of diaphragm chamber 76 in the locking device 14 and diaphragm chamber 87 in the cut-off valve device. The venting of chamber 76 will permit spring 74 to move the dog 67 of the plunger 66 into locking relation with rod 17 at one side or the other of one of the teeth 68 or 69, dependent upon the load adjusted position of said rod, to hold said rod in such adjusted position, while the venting of chamber 87 will permit spring 85 to move the diaphragm 86 to the position in which it is shown in Fig. 1 for reducing the pressure of said spring on diaphragm 84 to such a degree as to prevent said spring moving diaphragm 84 and slide valve 29 out of their cut-off position until brake pipe pressure in chamber 81 is reduced subsequently to a relatively low pressure such as ten pounds. The venting of passages 102 and 77 merely dissipates the fluid under pressure remaining in the volume reservoir 103, check valve chamber 79 and diaphragm chamber 23 of the control device 13, it being noted however that choke 111 restricts such venting with respect to release of fluid under pressure from diaphragm chamber 76 to ensure operation of plunger 66 into locking relation with rod 17 while the diaphragm 23 and piston 34 or 20 of the control device 13 are yet positively held in their load adjusted position by pressure of fluid.

It will now be seen that in charging the brake pipe 1 with fluid under pressure, the rod 17 and thereby the slide valve 44 will be adjusted to either one of its three different positions according to whether the vehicle is empty, fully-loaded, or partially loaded and will be then locked by plunger 36 in the adjusted position until the brake pipe is subsequently recharged following depletion thereof to below the relatively low pressure of ten pounds. When the rod 17 is in its empty position, as shown in Fig. 1, dog 67 will be disposed to the right of tooth 69, and when the rod 17 is in its partially loaded position the dog 67 will be disposed between teeth 68 and 69, and, when the rod 17 is in its fully loaded position, the dog 67 will be at the left-hand side of tooth 68.

As before mentioned, the numeral 13 designates a load adjustable control device and said device is adapted to operate upon supply of fluid under pressure to the brake cylinder pressure chamber 9 to control pressure of fluid in brake cylinder compensating chamber 12 for thereby varying the degree of braking of the vehicle in accordance with the adjustment of rod 17 and slide valve 44.

Now, when the rod 17 is adjusted for braking an empty vehicle, slide valve 44 will assume the position in which it is shown in Fig. 1. Therefore, when fluid under pressure is supplied to brake cylinder passage 5, fluid under pressure will flow to chamber 30 in control device 13, whence it will flow through port 45 in slide valve 44 and passage and pipe 46 to the load compensating chamber 12 in the brake cylinder device 7. It will thus be seen that for an empty vehicle the braking power for any degree of brake application will be limited, with respect to a loaded or partially loaded vehicle, by an equal fluid pressure acting on the area of piston 8 surrounding the cylinder 11 in opposition to the brake applying force created by the fluid under pressure in chamber 9.

When the rod 17 is positioned for braking a fully loaded vehicle in which, as previously noted, the dog 67 will be disposed at the left-hand side of tooth 68, and the slide valve 44 will be in a position in which passage 46 is cut off from port 45 and connected by way of port 47 to atmospheric port 48. In this position of the slide valve 44 the load compensating chamber 12 of the brake cylinder device 7 will therefore be vented to atmosphere by way of passage 46. With the load compensating chamber 12 vented to atmosphere, the degree of braking of the loaded vehicle will be governed solely by the pressure of fluid acting in chamber 9 on piston 8.

When the rod 17 is positioned for braking a partially loaded vehicle, the dog 67 will be interposed between the teeth 68 and 69, and the slide valve 44 will be in a position in which port 45 in said slide valve registers with passage 49, thereby connecting slide valve chamber 30 to limiting valve chamber 51. Upon operation of brake controlling valve device 3 in effecting a brake application to supply fluid under pressure to main pressure chamber 9 via passages 4 and 5, fluid under pressure supplied to chamber 30 through passage 5 will now flow through port 45 and passage 49 to chamber 51 and thence past valve 50 to chamber 56, whence it will flow through passage 46 to load compensating chamber 12.

As the pressure of fluid in presure chamber 9 continues to increase, the pressure of fluid supplied to compensating chamber 12, and likewise to diaphragm chamber 58, will likewise increase until such time as the fluid pressure in chamber 58 exerts a force on diaphragm 57 sufficient to overcome the opposing force of spring 60, at which time said diaphragm will deflect upwardly and permit spring 53 to seat valve 50. With the seating of valve 50 further flow of fluid under pressure to compensating chamber 12 will be discontinued and further supply of fluid under pressure by brake control valve device 3 will be effective in pressure chamber 9 only. Thus, in applying the brakes on a partially loaded vehicle the application will be modified by the supply of fluid at a chosen pressure to compensating chamber 12, thereby providing the proper degree of braking for such vehicle.

In effecting a release of the brakes the brake controlling valve device 3 will connect brake cylinder passage 5 to atmosphere. Upon the resultant reduction in pressure in connected chamber 63, check valve 64 will unseat to permit venting of the compensating chamber 12 therethrough, thus by-passing and avoiding possible delay by valve 50.

For effecting a release of the brakes on an empty vehicle, check valve 64 will unseat in the same manner as for a partially loaded vehicle.

In effecting a release of the brakes on a fully loaded vehicle, it follows that fluid under pressure will be vented from the main pressure chamber 9 by way of passages 5 and 4 and brake controlling valve device 3 in the usual manner, since fluid under pressure is supplied only to chamber 9 in effecting an application of the brakes.

*Description and operation—Fig. 2*

The structure shown in Fig. 2 differs from that shown in Fig. 1 only in that, when providing braking for a partially loaded vehicle, the pressure of fluid being supplied to the load compensating chamber 12 is balanced against the opposing force of a diaphragm of smaller area subject to pressure of fluid being supplied to the main pressure chamber to thereby provide the proper braking for the vehicle regardless of the degree of brake pipe reduction and hence pressure of fluid provided in the brake cylinder chamber 9.

In the modified fluid pressure control device 116 shown in Fig. 2, chamber 59 is defined in part by a second diaphragm 117, smaller in diameter than diaphragm 57 and having at its opposite side a chamber 118 which is in open communication with brake cylinder passage 5 by way of passage 119 and chamber 63. Contained in chamber 118 is a spring 120 which is preferably stronger than spring 53 so as to normally maintain valve 50 in its open position. A modified stem 158 of valve 50 makes a positive connection in chamber 59 between diaphragms 57 and 157.

With slide valve 44 locked in position for braking a partially loaded vehicle port 45 registers with passage 49, thereby connecting chamber 30 to load compensating chamber 12 by way of passage 49, chamber 51, past valve 50, through chamber 56 and thence to passage 46.

In operation, when a brake application is made on a partially loaded vehicle, fluid under pressure supplied to pressure chamber 9 in brake cylinder device 7 and to chamber 30 in control device 13 will also flow through port 45 in slide valve 44 and passage 49 to chamber 51. With valve 50 held in its normal unseated position by spring 120 fluid under pressure thus supplied to chamber 51 will flow past said valve to diaphragm chamber 58, whence it will flow by way of passage 46 to compensating chamber 12 in brake cylinder device 7.

Thus, as in the case of Fig. 1, fluid under pressure supplied to main pressure chamber 9 will also flow to compensating chamber 12. In this structure, however, valve 50 is held unseated by pressure of spring 120 plus pressure of fluid supplied to brake cylinder passage 5 until a preponderance of pressure in chamber 56 causes diaphragm 57 to deflect upward, seating valve 50 and cutting off further flow of fluid under pressure to compensating chamber 12, thereby limiting the compensating chamber pressure to a proportional amount of that acting in chamber 9 to provide the desired degree of braking for the partially loaded car, regardless of the degree of brake application desired as determined by the pressure of fluid provided in the brake cylinder chamber 9.

*Summary*

From the foregoing it will be seen that with this invention, I have provided an improved variable load brake apparatus having three stages of load control, adjustable only during charging or recharging the brake equipment, in which the proportioning of main brake cylinder pressure and compensating pressure is controlled by a control valve device only in the partially loaded condition of the car. In the load position the compensating chamber is open to atmosphere and in the empty position the compensating chamber is connected directly to the main brake cylinder pressure chamber.

Having now described my invention, what I claim as new and desire to secure by Letters Patent, is:

1. In a variable load brake apparatus for a vehicle in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative to supply fluid under pressure to said main chamber, control valve means having one position for connecting said main chamber to said compensating chamber for braking an empty vehicle, a second position for supplying fluid under pressure from said main chamber to said compensating chamber to a determinate degree of pressure for braking a partially loaded vehicle and a third position for cutting off said main chamber from said compensating chamber for braking a loaded vehicle, a first movable abutment operable by fluid under pressure to move said valve means to said one position, a second movable abutment operable by fluid under pressure to move said valve means to said second position against pressure fluid acting on said first movable abutment, a third movable abutment operable by fluid under pressure to move said valve means to said third position against pressure of fluid acting on said first movable abutment, cut-off valve means responsive to pressure of fluid in said brake pipe of less than a chosen degree to supply fluid under pressure from said brake pipe directly to said first abutment and also for delivery to said second and third abutments and in response to a chosen high degree of pressure to release such fluid under pressure, a load carrying vehicle sprung part, a vehicle unsprung part, and means carried by one of said parts and operable by fluid under pressure supplied by said cut-off valve means to contact the other of said parts and to deliver fluid under pressure to act on said second or third abutment or connect said abutments to atmosphere according to the load on said vehicle.

2. In a variable load brake apparatus for a vehicle in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative to supply fluid under pressure to said main chamber, control valve means having an empty position in which said main chamber is connected to said compensating chamber, a partially loaded position in which fluid under pressure supplied to said main chamber is delivered to said compensating chamber to a determinate degree of pressure and a load position in which said main chamber is cut off from said compensating chamber, a first movable abutment operable by fluid under pressure to move said valve means to said empty position, a second movable abutment operable by fluid under pressure to move said valve means to said partially loaded position against pressure acting on said first movable abutment, a third movable abutment operable by fluid under pressure to move said valve means to said load position against pressure of fluid acting on said first movable abutment, cut-off valve means responsive to pressure of fluid in said brake pipe of less than a chosen degree to supply fluid under pressure directly to said first abutment and in response to a chosen high degree of pressure to release such fluid under pressure, a load carrying vehicle sprung part, a vehicle unsprung part, and means carried by one of said parts and operable by fluid under pressure supplied by said cut-off valve means to deliver fluid under pressure to act on said second or third abutments according to the load on said vehicle.

3. In a variable load brake apparatus for a vehicle in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative to supply fluid under pressure to said main chamber, modifying valve means operative to supply fluid under pressure from said main chamber to said compensating chamber until a certain degree of pressure is attained in said compensating chamber, said modifying valve means comprising a spring, a diaphragm subject on one side to pressure of said spring and on the opposite side to pressure of fluid being supplied to said compensating chamber, and a valve normally held open by said spring and operable to its closed position by said diaphragm, selector valve means having one position in which said main chamber is connected directly to said compensating chamber, another position in which said main chamber is cut off from said compensating chamber, and an intermediate position in which said main chamber is connected to said modifying valve means, and means for actuating said selector valve means to any one of the aforesaid positions.

4. In a variable load brake apparatus for a vehicle in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative to supply fluid under pressure to said main chamber, modifying valve means operative to supply fluid under pressure from said main chamber to said compensating chamber until a certain relation between the pressures in said main chamber and said compensating chamber is attained, said modifying valve means comprising a spring, a valve normally held open by said spring for admitting fluid under pressure to said compensating chamber, a pair of spaced opposing diaphragm of dissimilar effective areas positively connected to said valve having their adjacent surfaces open to atmosphere, the smaller of said diaphragms being subject on its opposite face to pressure of said spring and of fluid supplied to said main chamber and the larger of said diaphragms being subject on its opposite surface to opposing pressure of fluid supplied to said compensating chamber, selector valve means having one position in which said main chamber is connected directly to said compensating chamber for braking an empty vehicle, another position in which said main chamber is cut off from said compensating chamber for braking a loaded vehicle, and an intermediate position in which said main chamber is connected to said modifying valve means for braking a partially loaded vehicle, and means for actuating said selector valve means to any one of the aforesaid positions.

5. In a vehicle brake apparatus, in combination, slide valve means having three different positions of adjustment to provide three different degrees of vehicle braking, a first movable abutment operable by fluid under pressure to move said slide valve means to one of said positions for braking an empty vehicle, a second movable abutment operable by fluid under pressure to move said slide valve means to a second of said positions against pressure of fluid acting on said first abutment for braking a partially loaded vehicle, a third movable abutment operable by fluid under pressure to move said slide valve means further to a third of said positions against pressure of fluid acting on said first movable abutment for braking a fully loaded vehicle, a brake pipe, another valve means responsive to pressure of fluid in said brake pipe of less than a chosen degree to supply fluid under pressure from said brake pipe directly to said first abutment and also for delivery to said second and third abutments and operative when in excess of a chosen high degree to release such fluid under pressure, a load carrying vehicle sprung part, a vehicle unsprung part, and means carried by one of said parts and operable by fluid under pressure supplied by said valve means to deliver fluid under pressure to act on said second or third abutments according to the vehicle load.

6. In a variable load vehicle brake apparatus, in combination, a brake control element adjustable to one position for braking an empty vehicle, to a second position for braking a partially loaded vehicle and to a third position for braking a fully loaded vehicle, one movable abutment operated by fluid under pressure to move said element to said one position, a second movable abutment adapted to move said element in response to fluid under pressure against pressure of fluid acting on said one abutment to said second position, a third movable abutment adapted to move said element in response to fluid under pressure against pressure of fluid acting on said one abutment to said third position, a vehicle load sprung part, a vehicle unsprung part, and a strut device comprising a casing carried by one of said parts and piston means in said casing operable in response to pressure of fluid supplied to said first movable abutment to move into contact with the other vehicle part for connecting said second and third abutments to atmosphere for an empty vehicle, said first abutment to said second abutment for a partially loaded vehicle, and said first abutment to said second and third abutments for a fully loaded vehicle.

7. In a variable load brake apparatus for a vehicle, in combination, a brake control element adjustable to a plurality of different positions corresponding to different degrees of vehicle load, one movable abutment adapted to be operated by fluid under pressure to move said element to one of said positions, a second movable abutment adapted to move said element to a second one of said positions against pressure of fluid acting on said one abutment, a third movable abutment adapted to move said element to a third one of said positions against pressure of fluid acting on said one abutment, a vehicle load sprung part, a vehicle unsprung part, a strut device comprising a casing carried by one of said parts and piston means in said casing operable in response to pressure of fluid supplied to said first movable abutment to move into contact with the other vehicle part for connecting fluid under pressure supplied to said one movable abutment and to said piston to said second movable abutment in a partial loaded position of said sprung part relative to said unsprung part, said casing having one port connecting said piston to said one abutment, a second port connected to said second abutment and a third port connected to said third abutment, said piston being operable in response to fluid under pressure supplied to said one port to contact said other vehicle port for connecting said second and third ports to atmosphere or to said one port successively according to the load on the vehicle.

8. In a variable load brake apparatus for a vehicle in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative to supply fluid under pressure to said main chamber, modifying valve means operative to supply fluid under pressure from said main chamber to said compensating chamber until a certain relation between the pressure in said main chamber and said compensating chamber is attained, said modifying valve means comprising a spring, a valve normally held open by said spring for admitting fluid under pressure to said compensating chamber, a differential area diaphragm means operatively connected to said valve and subject on the smaller area to pressure of said spring and of fluid in said main chamber for opening said valve and on the larger area to opposing pressure of fluid in said compensating chamber, selector valve means having one position in which said main chamber is connected directly to said compensating chamber for braking an empty vehicle, another position in which said main chamber is cut off from said compensating chamber for braking a loaded vehicle, and an intermediate position in which said main chamber is connected to said modifying valve means for braking a partially loaded vehicle, and means for actuating said selector valve means to any one of the aforesaid positions.

References Cited in the file of this patent

UNITED STATES PATENTS

| Number | Name | Date |
|---|---|---|
| 2,344,868 | Hewitt | Nov. 21, 1944 |
| 2,364,927 | Sudduth | Dec. 12, 1944 |
| 2,447,857 | Hewitt | Aug. 24, 1948 |